United States Patent [19]
Maine

[11] Patent Number: 4,515,739
[45] Date of Patent: May 7, 1985

[54] MATRIX COATING SYSTEM AND METHOD OF MANUFACTURE THEREOF

[75] Inventor: Richard L. Maine, Willimantic, Conn.

[73] Assignee: Rogers Corporation, Rogers, Conn.

[21] Appl. No.: 546,208

[22] Filed: Oct. 27, 1983

[51] Int. Cl.[3] .......................... B32B 5/18; B32B 5/20; B41B 5/02; B41D 7/00

[52] U.S. Cl. .................................. 264/45.3; 101/401.1; 101/401.2; 101/401.3; 264/46.4; 264/46.7; 264/54; 264/321; 264/DIG. 2; 427/373; 428/304.4; 428/308.4; 428/319.1; 428/319.3; 428/908

[58] Field of Search ............... 101/401.1, 401.2, 401.3; 264/46.4, 46.7, 48, 52, 55, DIG. 82, 45.3, 54, 321, DIG. 2; 428/908; 427/373

[56] References Cited

U.S. PATENT DOCUMENTS

| | | | |
|---|---|---|---|
| 2,509,499 | 5/1950 | Higgins et al. | 428/908 |
| 2,852,282 | 3/1958 | Gergen et al. | 264/52 |
| 2,903,546 | 9/1959 | O'Mara | 101/401.3 |
| 3,377,950 | 4/1968 | Squitieri et al. | 101/401.2 |
| 3,389,195 | 6/1968 | Gidnakos et al. | 264/DIG. 82 |
| 3,391,637 | 7/1968 | Reynolds et al. | 101/401.3 |
| 3,589,961 | 6/1971 | Fordyce et al. | 428/908 |
| 3,779,761 | 12/1973 | Dustin | 264/52 |
| 4,016,814 | 4/1977 | Schank et al. | 427/373 |
| 4,137,363 | 1/1979 | Maron et al. | 428/908 |
| 4,229,400 | 10/1980 | Lauril | 428/908 |

FOREIGN PATENT DOCUMENTS

| | | |
|---|---|---|
| 144185 | 5/1950 | Australia . |
| 249894 | 11/1960 | Australia . |
| 1362339 | 4/1964 | France . |
| 1441854 | 7/1976 | United Kingdom . |

*Primary Examiner*—James C. Cannon
*Attorney, Agent, or Firm*—Fishman & Dionne

[57] ABSTRACT

A matrix coating system and method of manufacture thereof is presented wherein the matrix coating contains chemical blowing agents which permit low pressure molding and also the formation of printing plates having deep relief. The method of manufacture is such that a foamed coating is produced which at molding temperatures is highly compressible at low pressures and which also expands into the relief or nonprinting regions of the pattern plate. The unusually low molding pressures necessary result in less distortion of rubber pattern plates or made from photo polymers. In addition, the combination of high compressibility in appropriate areas, and of volume expansion in relief areas allows the board coating to conform before and during cure to pattern plates of deep relief, so that in the cured state there results a rigid, durable high fidelity mold useful for molding numerous flexographic printing plates.

36 Claims, 3 Drawing Figures

MATRIX COATING SYSTEM AND METHOD OF MANUFACTURE THEREOF

BACKGROUND OF THE INVENTION

This invention relates to the field of matrix board coatings for use in the formation of printing plates. More particularly, this invention relates to a new and improved matrix coating system and method of manufacture thereof wherein the matrix coating contains blowing agents which permit low pressure molding from rubber and photopolymer master plates as well as the formation of matrices having deep relief. Additionally, this invention relates to the use of less compressible board and fewer applications of coatings to give relief equivalent to conventional coated boards when either metallic, polymeric and/or elastomeric master plates are used.

In the manufacture of matrix boards for use in forming flexographic printing plates, impressions are formed in the matrix board by means of a master. The impressioning is usually accomplished by pressing the matrix material against the master plate at relatively high pressure and heat. While engraved metal plates are normally used as the masters from which the matrix plates are formed, engraved metal masters (i.e., magnesium, copper or zinc) are expensive (requiring acid etching), relatively difficult to make and sometimes pose environmental waste problems due to the chemicals necessary for the engraving process. From the standpoints of economy, ecology and ease of manufacture, it is preferable to use rubber or photopolymer materials to form the master plate. However, difficult problems arise with the use of these materials in terms of adequate relief and proper definition in the printing plates. An even more serious problem is encountered in the use of rubber or photopolymer masters when it is desired to form deep relief (0.15 inches. and greater) impressions in matrix boards to be used for forming deep relief flexographic printing plates. The principal problem in using rubber or photo relief polymer (PRP) pattern plates for molding against conventional matrix board is that in order to obtain the desired deep relief impression in the matrix board, high pressure (on the order of 300 psi to 1000 psi) and temperature (on the order of 300° F.) must typically be used in pressing the matrix material against the master plate. This high pressure and temperature tend to distort the rubber and photopolymer masters whereby unsatisfactory matrices are obtained and/or the masters are damaged.

Another problem associated with conventional matrix board coatings for deep relief is that the application of standard coatings to the matrix board involves expensive and time consuming multiple applications of coating layers. This buildup of multiple coatings is necessary in obtaining the important, yet heretofore limited relief for the rubber printing plates.

SUMMARY OF THE INVENTION

The above discussed and other problems of the prior art are overcome or alleviated by the matrix coating system and process for manufacturing the same of the present invention. In accordance with the present invention, a novel coating is applied to conventional matrix boards or to other suitable substrates used in the flexographic printing art. This improved matrix coating system allows the use of photo relief polymer patterns or master plates for production of molds and duplicate molded rubber flexo printing plates. Thus, the present invention covers two separate molding steps, the first of which produces a rigid mold formed out of the matrix board by imprinting the board with an image from the pattern plate; and the second separate molding step in which the matrix mold is used to imprint the image onto rubber (flexographic) printing plates. The matrix board coating of the present invention overcomes or alleviates the problems associated with achieving adequate relief depths as well as allowing multiple moldings of several matrix boards by the pattern or master plate without distortion. These multiple moldings are achieved with little damage to the pattern plate and therefore far more moldings are possible from a single pattern plate than in the prior art. The molded matrix formed according to the present invention withstands the molding of multiple duplicate flexo plates indicating its stability.

The highly desirable advantages of the present invention are achieved by providing a coating for conventional matrix boards formulated with a variety of chemical blowing agents so that a relatively low density porous layer results and is capable of being compressed with low pressure and also expanding further into the master plate during molding. This novel coating expansion allows for low molding pressures (30 psi to 200 psi) to be used while obtaining deeper relief in the molds without distorting the master PRP plate. Thus, unlike the prior art coatings wherein the matrix relief was achieved entirely by high pressure and temperature applied to the master PRP plate, the coating of the present invention is of lower density and is easily compressed and partially expands (in a particular temperature range) into the pattern plate while far lower pressures are applied on the master during molding.

The characteristics of the coating formulation further provide an unexpected durability to the coating itself after molding. While it would be expected that the mechanical action and high pressures involved in forming the rubber printing plates would readily damage the relatively low density foam coating of the present invention, surprising durability of the novel matrix board coating (equivalent to molds of higher density) is present even after a series of rubber printing plates have been molded.

Finally, the expensive and time consuming application of multiple coating layers and/or use of powder molding compounds sometimes required in the prior art matrix coatings to attain deep relief is eliminated by the present invention. Thus, because of the expanding nature of the foam coating of the present invention, a particular relief depth may be controlled simply by varying the thickness and/or formulation (i.e., amount and type of blowing agents, resin or fillers) of the coating. This advantage permits less labor in preparation of the coated matrix boards as well as less expense in material costs.

The above discussed and other advantages of the present invention will be apparent to and understood by those skilled in the art from the following detailed description and drawings:

BRIEF DESCRIPTION OF THE DRAWINGS

Referring now to the drawings, wherein like elements are numbered alike in the several FIGURES.

DESCRIPTION OF THE PREFERRED EMBODIMENT

A matrix coating system formed in accordance with the present invention comprises a conventional matrix board or other suitable substrate with a novel polymeric coating formed thereon. The improved and novel coating includes a thermosetting molding material (liquid or powdered resins), mold release agents, mineral or organic fillers, pigments, dyes, dispersents, surfactants, binders and chemical blowing agents. The blowing agents utilized in the present invention are preferably organic nitrogen compounds which are stable at normal mixing temperatures but thereafter undergo a controllable gas evolution within predetermined conditions and temperature ranges. These blowing agents in conjunction with the thermosetting molding materials provide an expandable foam coating to the matrix material.

Figure 1:
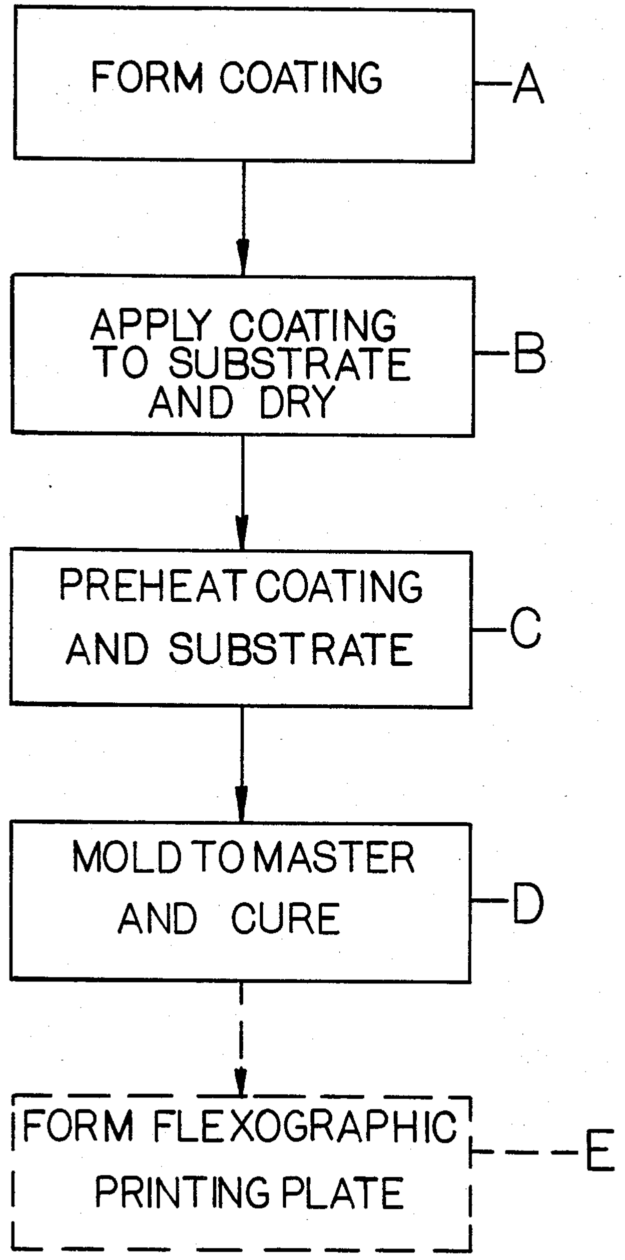
FIG. 1 is a flow diagram showing the method of forming the matrix board and coating of the present invention.

Referring to FIG. 1, the matrix board and coating system is formed in a process which initially includes preparation of the matrix coating as shown in Step A. In a preferred embodiment, the coating is manufactured by finely grinding (100%-100 mesh) a phenolic molding material which is then slurried in a liquid vehicle. This liquid may be any suitable material such as, but not limited to liquid resole resin, water, alcohol or mixtures thereof. Alternatively, the finely ground phenolic molding material may be omitted completely with the coating made from liquid resole resins, mineral and/or organic fillers. In light of current environmental and cost considerations, an advantage of the coating of the present invention is that it may be used in an aqueous system whereas the prior art coatings have traditionally used alcohol solvent solutions. The liquid slurry is then mixed with other ingredients such as waxes and/or stearates in order to facilitate molding release. Binders such as guar gum hydroxy ethyl cellulose or HEC and inorganic fillers such as mica, silica or glass beads may also be added as desired. It should be appreciated that the coating formulation including aqueous and solvent vehicles may be varied to obtain a variety of properties depending upon the needed requirements. It has been found that a preferred commercial formula of the present invention comprises the combination of a liquid resin and mineral filler along with some of the other additives as mentioned above.

Following this preliminary preparation, a suitable blowing agent is then added to the mixture. Good results have been achieved with amounts of from 0.5 to 10 weight percent of blowing agent based on the total solid weight; the best result being achieved with about 3 weight percent blowing agent. A preferred blowing agent which has shown good results at this 3 weight percent amount is CELOGEN TSH (paratoluenesulfonylhydrazide manufactured by Uniroyal Chemical). Other preferable blowing agents include one or more of the following:

P, P' - oxybis (benzenesulfonyl hydrazide) (manufactured under the trademark CELOGEN OT by Uniroyal Chemical).

Dinitrosopentamethylenetetramine (DNPT) (manufactured under the tradenames OPEX 93 and OPEX 100 by Olin Chemical).

CELOGEN 754 (proprietary sulfonylhydrazide formula manufactured by Uniroyal Chemical).

CELOGEN XP-100 (proprietary modified Azodicarbonamide formula manufactured by Uniroyal Chemical).

Also tested and of lesser success was ammonium bicarbonate. It should be understood that the matrix coating of the present invention is not limited to the above blowing agents, but includes any suitable blowing agent used in conjuction with a matrix coating.

Blowing agents will undergo a controlled gas evolution (preferably nitrogen gas) in a temperature range specific to its chemical environment. This temperature range corresponds to the temperature in which the blowing agent undergoes decomposition. It is advantageous therefore, to choose a blowing agent and formulation which emits gas under the same temperature in which the thermosetting constituent in the coating is polymerized. A typical phenolic-based molding material which is incorporated into the conventional matrix coatings is commonly cured at 290° F. to 310° F. For this reason, the above mentioned blowing agents all undergo or can be modified to undergo nitrogen gas evolution (i.e., decomposition) in that temperature range.

When Step A (preparation of the matrix coating with blowing agent mixed therein) is completed, the coating is applied to a conventional matrix board as shown in Step B of FIG. 1. The coating can be applied to the matrix board by any suitable method such as by a spray or curtain coater. The sprayed matrix board subsequently undergoes drying to remove the liquid vehicle. In preparing the matrix coatings, the evolution of gas at a much lower temperature than the rated decomposition temperature of the blowing agent was unexpectedly discovered. This led to the formation of a foamed structure during the operation wherein the coating is dried on the board. It became apparent that this foam structure is advantageous to the end use. At this point, it is not fully known why the blowing agents undergo this initial decomposition and resultant expansion during the drying step. It is believed that the blowing agents undergo this preliminary decomposition because of a variety of factors including Ph or a reaction with water and/or other components in the mixture. A reason why the mechanism for low temperature decomposition is undetermined is due, in part, to the uncommon usage of phenolic molding materials and blowing agents in an aqueous solution.

While the blowing agents are preferably added to the matrix coating during Step A, a possible alternative would be to add in the blowing agent during Step B. Thus, the blowing agent could be added while the coating was being applied to the matrix board.

In the prior art, better relief capabilities required thicker coatings. These thicker coatings could only be achieved by a plurality of coating applications to the matrix board. This practice proved expensive and time consuming and still resulted in limited relief as well as often damaging the pattern plate. In the present invention, the preliminary expansion during the drying and subsequent steps eliminates this inefficient application of several coatings. The matrix coating system of the present invention thus provides a dried coating of greater thickness and lower density than in the prior art. The actual desired thickness will, of course, depend on the end use. Deeper reliefs generally require thicker coatings, for example, a relief of 0.03 inches is compatible with a coating of 0.03 inches.

Upon the completion of step B, the matrix board is ready to be used by a plate maker to form a matrix from a master and then to form flexographic printing plates from the matrix. Normally, the matrix board would be formed through step B by the manufacturer of matrix materials, and the matrix boards will be delivered in this unmolded state to distributors or end users.

When it is desired to form a sheet of the matrix material into a predetermined pattern, an unmolded matrix board undergoes a preliminary preheating stage. This preheating step is shown in Step C of FIG. 1. Step C acts to precondition and soften the phenolic coating prior to molding the master plate. The preheating step also drives off any excess volatiles. In this preheating step, the coating may undergo further volume expansion as the blowing agent partially decomposes under the increased temperature. While preheating in an air circulating oven is preferred, the press itself may provide the desired premold warming.

Generally, the preheating involves 30–120 seconds, preferably 45–60 seconds at 390° F.–410° F., preferably 400° F. in an oven, although both the time and temperature will vary depending on coating thickness, density and the preheating equipment used. After the matrix board/coating system is preheated, it will have a very soft consistency and, as mentioned, may have expanded under the gas evolving blowing agent.

Step D, the molding of the matrix board to the master plate and curing, is done in a molding press at temperatures ranging from 290° to 310° F. and at pressures ranging from about 30 psi to 300 psi, and preferably at about 200 psi. The preferred molding pressure of 200 psi is an exceptionally low pressure for the molding of matrix boards, especially deep relief matrix boards. Pressures of that low level can be used in the present invention because of the soft, porous nature and expansion of the matrix coating caused by the blowing agents. While the blowing agents are causing the coating to expand, the phenolic resin is simultaneously curing to form a hardened three-dimensional network of resin, trapped nitrogen gas bubbles and other components.

Thus, while the prior art required high pressures (300–1000 psi) for the master pattern to be pressed into the matrix board, the present invention permits the use of far lower pressures by providing a very soft coating as well as letting the matrix coating itself expand into the pattern on the master plate while simultaneously pressing the master plate into the expanding matrix coating and board.

The use of this novel coating/matrix board system readily permits the use of the relatively soft photo relief polymer master or pattern plates without damage or distortion thereto. Further, despite the low pressures employed, an even deeper, more defined relief may be obtained from the PRP engravings than is currently possible with conventional matrix coatings.

After molding and curing of the matrix board as in Step D, the matrix board is used to form a flexographic printing plate in Step E, which may be accomplished in typical fashion by molding a rubber or similar material into the rigid mold of the matrix board to form a flexographic type printing plate. Since the matrix board formed in accordance with the present invention can withstand higher pressures after molding of the matrix board than before, the flexographic printing plate can be formed in the matrix board mold under substantially higher pressures than the matrix itself can be formed.

A surprising and unexpected result has been found in the durability of the coating itself after molding a series of rubber flexographic printing plates. While one skilled in the art would expect that the mechanical action involved in molding such rubber plates would readily damage a low density foam coating, this has not been found to be the case. In fact, the novel molded matrix and foam coating of the present invention is extremely strong and durable. This strength is derived, in part, because the raised areas on the master plate act to compress and force the coating on the matrix board into the recessed areas on the master during molding. This, in turn, causes the raised area on the matrix to be stronger because of the higher coating density.

Figure 2:
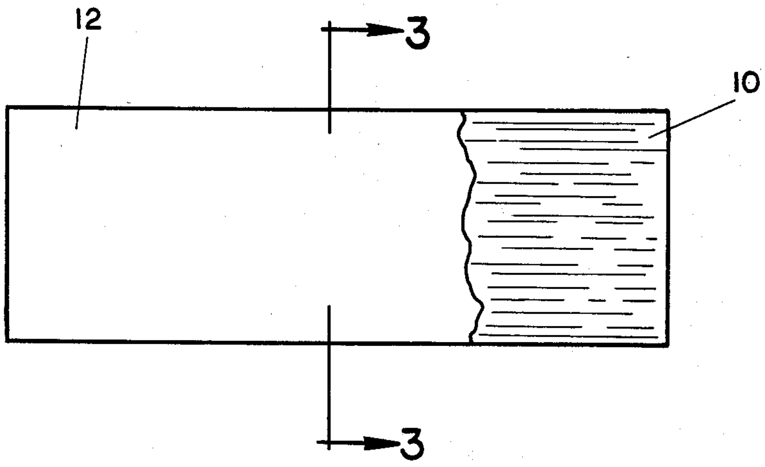
FIG. 2 is a planar view, partly in section, of a coated matrix board in accordance with the present invention.
Figure 3:
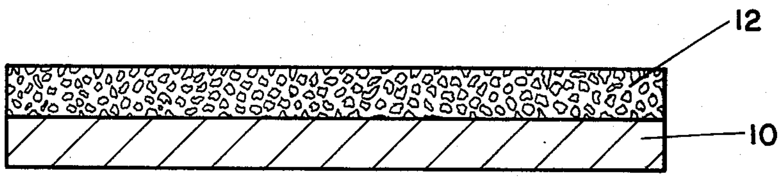
FIG. 3 is a sectional view of the matrix board of FIG. 2 taken along line 3—3.

Referring jointly now to FIGS. 2 and 3, a matrix board and coating as it would appear after having been processed through Step B of FIG. 1 is shown. The matrix board/coating system includes a conventional matrix board 10. The conventional matrix board is generally comprised of cellulose fibers (i.e., wood or rag pulp), mineral fillers (i.e., mica or diatomaceous particles), a powdered phenolic resin and possibly other components. These ingredients are suspended in water and fed through a wet paper machine. When the desired thickness is achieved, the matrix board is dried and ready for the coating to be applied thereto. As in the earlier discussion concerning the coatings, the matrix board thickness will vary with desired end use and may typically range in thickness from 0.05 inches to 0.350 inches. The novel coating is identified at 12 and is shown as a porous, relatively thick layer ranging in thickness from 0.015 inches to 0.250 inches.

It should be understood that while FIGS. 2 and 3 show a conventional matrix board 10 to which the novel matrix coating has been applied, any other compatible substrate would equally suffice. Typical requirements and concerns in deciding on alternative substrates include sufficient adhesion and adequate dimensional stability during the application, drying, cutting, molding and plating steps of the novel matrix coating. Note that the desirable compressibility features of conventional matrix board as described above is no longer as necessary or important when utilizing the matrix coating of the present invention in view of the thicker, softer nature of the novel coating and especially in light of the expandable blowing agents incorporated therein. Accordingly, other substrates suitable for combination with the novel matrix coating which may be heated or unheated include, but are not limited to magnesium photo engraving sheets, other metal sheets such as aluminum or steel (preferably having a thin width of 0.010 inch to 0.025 inch), wood veneers, plywood (preferably ⅛ inch to ¼ inch), bakelite insulating panel, glass, nitration pulp sheets, phenolic impregnated cellulose sheets and plastic, glass or wire mesh. The use of substrates other than conventional matrix board offer many advantages including possible reusability, lower cost and improved quality control of thickness, surface finish, etc. As discussed earlier, the coating is comprised of a phenolic resin molding material, preferably finely ground, and/or a variety of binders, liquid resole resins, inorganic fillers, organic fillers, waxes, stearates, dyes, pigments, surfactants, dispersents and finally, the novel addition of certain, previously identified, chemical blowing agents.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A method of making a matrix for molding printing plates including the steps of:
combining a matrix coating and at least one chemical blowing agent to form a slurry;
applying said slurry to a substrate to form a wet coating;
drying said wet coating whereby a porous partially expanded matrix coating which is moldable and curable under heating conditions is formed on said substrate.

2. The method of claim 1 wherein:
said substrate is a matrix board.

3. The method of claim 2 wherein:
said matrix board comprises cellulose fibers, mineral fillers and polymeric molding material.

4. The method of claim 1 wherein said substrate is selected from the group comprised of:
plastic mesh, wire mesh, glass mesh, metal fiber sheet, metal sheet, wood veneer, plywood, bakelite insulating panel, glass, nitration pulp sheet, phenolic impregnated cellulose sheet, and magnesium photo engraving metal sheet.

5. The method of claim 1 wherein:
said matrix coating comprises polymeric molding material.

6. The method of claim 5 wherein:
said polymeric molding material is a thermosetting molding material.

7. The method of claim 6 wherein:
said thermosetting molding material is a liquid resole resin.

8. The method of claim 7 including:
an inorganic filler combined with said liquid resole resin.

9. The method of claim 7 including:
an organic filler combined with said liquid resole resin.

10. The method of claim 6 wherein:
said thermosetting molding material is a phenolic resin.

11. The method of claim 8 wherein:
said polymeric molding material is finely ground.

12. The method of claim 5 including the step of combining a liquid vehicle with said polymeric molding material.

13. The method of claim 12 wherein said liquid vehicle includes at least one of the following:
liquid resole resins, water and alcohol.

14. The method of claim 1 wherein said matrix coating includes at least one of the following:
waxes, stearates, binders, inorganic fillers, organic fillers, pigments, dyes, dispersents, surfactants and liquid resole resins.

15. The method of claim 1 wherein:
said chemical blowing agents include at least one of the following:
P, P' - oxybis (benzenesulfonyl hydrazide);
Dinitrosopentamethylenetetramine;
Sulfonylhydrazide;
Azodicarbonamide;
Ammonium bicarbonate.

16. The method of claim 1 wherein:
said chemical blowing agent is from 0.5 to 10% weight percent of total solid.

17. A method of molding printing plates from a matrix including the steps of:
preheating a coated matrix board containing blowing agents produced by the method of claim 2 whereby the coating becomes soft and expands; and
molding a master plate to said preheated coated matrix board whereby said coating further expands into said master plate and is cured.

18. The method of claim 17 wherein:
said preheating is between 390°-410° F.

19. The method of claim 17 wherein:
said preheating is from 30-120 seconds.

20. The method of claim 17 wherein:
said master is molded under 30-300 pounds per square inch.

21. The method of claim 17 wherein:
said master is molded at between 290° F.-310° F.

22. The method of claim 17 including the step of molding a duplicate printing plate from said molded matrix board.

23. A matrix for molding printing plates including:
a substrate;
a matrix dried, porous partially expanded coating applied to said substrate;
said matrix coating containing chemical blowing agents and being moldable and curable under heating conditions.

24. The matrix of claim 23 wherein:
said substrate is a matrix board.

25. The matrix of claim 24 wherein:
said matrix board comprises cellulose fibers, mineral fillers and polymeric molding material.

26. The matrix of claim 23 wherein said substrate is selected from the group comprised of:
plastic mesh, wire mesh, glass mesh, metal fiber sheet, metal sheet, wood veneer, plywood, bakelite insulating panel, glass, nitration pulp sheet, phenolic impregnated cellulose sheet, and magnesium photo engraving metal sheet.

27. The matrix of claim 23 wherein:
said matrix coating comprises polymeric molding material.

28. The matrix of claim 27 wherein:
said polymeric molding material is a thermosetting molding material.

29. The matrix of claim 28 wherein:
said thermosetting molding material is a liquid resole resin.

30. The method of claim 29 including:
an inorganic filler combined with said liquid resole resin.

31. The method of claim 29 including:
an organic filler combined with said liquid resole resin.

32. The matrix of claim 28 wherein:
said thermosetting molding material is a phenolic resin.

33. The matrix of claim 27 wherein:
said polymeric molding material is finely ground.

34. The matrix of claim 23 wherein said matrix coating includes at least one of the following:
waxes, stearates, binders, inorganic fillers, organic fillers, pigments, dyes, dispersents, surfactants and liquid resole resins.

35. The matrix of claim 23 wherein:

said chemical blowing agents include at least one of the following:

paratoluenesulfonylhydrazide;

P, P' - oxybis (benzenesulfonyl hydrazide);

Dinitrosopentamethylenetetramine;

Sulfonylhydrazide;

Azodicarbonamide;

Ammonium bicarbonate.

36. The matrix of claim 23 wherein:

said chemical blowing agent is from 0.5 to 10% weight percent of total solid.

* * * * *